US006195615B1

(12) United States Patent
Lysen

(10) Patent No.: US 6,195,615 B1
(45) Date of Patent: Feb. 27, 2001

(54) METHOD OF MUTUALLY ALIGNING BODIES AND POSITION-MEASURING SENSOR THEREFOR

(75) Inventor: Heinrich Lysen, Garching (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 09/077,887

(22) PCT Filed: Feb. 14, 1996

(86) PCT No.: PCT/EP96/00623

§ 371 Date: Jun. 12, 1998

§ 102(e) Date: Jun. 12, 1998

(87) PCT Pub. No.: WO97/21980

PCT Pub. Date: Jun. 19, 1997

(30) Foreign Application Priority Data

Dec. 12, 1995 (DE) .............................. 195 46 405

(51) Int. Cl.⁷ ................. G01B 9/00; G02B 6/00
(52) U.S. Cl. ............... 702/94; 356/149; 33/281; 33/286
(58) Field of Search ............ 702/94, 95; 33/328, 33/383, 281, 286; 385/134, 136; 356/149, 350

(56) References Cited

U.S. PATENT DOCUMENTS

| | | | |
|---|---|---|---|
| 4,518,855 | * 5/1985 | Malak | 356/400 |
| 4,532,402 | * 7/1985 | Overbeck | 219/121.78 |
| 4,650,331 | * 3/1987 | Rodloff et al. | 356/350 |
| 4,882,845 | * 11/1989 | Boyer | 33/328 |
| 5,029,251 | * 7/1991 | Sundberg | 356/149 |
| 5,029,252 | 7/1991 | Ameseder . | |
| 5,038,485 | 8/1991 | Beissbarth . | |
| 5,042,505 | 8/1991 | Mayer et al. . | |
| 5,112,126 | 5/1992 | Graebner . | |
| 5,245,687 | * 9/1993 | Usui | 385/134 |
| 5,283,754 | 2/1994 | Stieler et al. . | |
| 5,596,403 | 1/1997 | Schiff et al. . | |
| 5,834,623 | 11/1998 | Ignagni . | |
| 5,841,932 | * 11/1998 | Page et al. | 385/134 |
| 5,850,289 | * 12/1998 | Fowler et al. | 356/376 |
| 6,038,524 | 3/2000 | Leger et al. . | |
| 6,052,911 | 4/2000 | Davis . | |

FOREIGN PATENT DOCUMENTS

| | | |
|---|---|---|
| 0 518 572 | 12/1992 | (EP) . |
| 0 557 591 | 9/1993 | (EP) . |
| 60-158310 | 8/1985 | (JP) . |
| PCT/BE96/00129 | 12/1996 | (WO) . |

* cited by examiner

*Primary Examiner*—Marc S. Hoff
*Assistant Examiner*—Bryan Bui
(74) *Attorney, Agent, or Firm*—Nixon Peabody LLP; David S. Safran

(57) ABSTRACT

The invention concerns a method of mutually aligning bodies, in particular for the parallel alignment of shafts, rollers and the like, which can be carried out economically and simply in a substantially shorter time than the known methods used for this purpose. The essence of the invention is the use of an optical gyroscope, for example a fiber-optic gyroscope (5), in a position-measuring sensor (4) which is placed in turn in a specific position on the bodies (1, 2, 3) to be mutually aligned for a given time interval to measure the relative angular position. The position-measuring sensor (4) supplies angle data on the basis of which it can be established whether, and if necessary which, position corrections have to be made at the bodies in order to bring them into the desired state of alignment. The invention further concerns a position-measuring sensor which can be used in the method according to the invention.

8 Claims, 1 Drawing Sheet

METHOD OF MUTUALLY ALIGNING BODIES AND POSITION-MEASURING SENSOR THEREFOR

BACKGROUND OF THE INVENTION

1. Field of the Invention

The invention relates to a method for mutually aligning bodies, in particular for the parallel alignment of shafts, rollers and the like, and to a position measuring sensor for carrying out the method.

To date, optical measuring arrangements such as theodolites, autocollimators, interferometers and lasers and, by way of further ancillary means, markers, targets, pentaprisms, ridge prisms, triple prisms, mirrors, detectors, stands and the like have been used in a very time consuming manner for angle measurement for the purpose of the mutual alignment of bodies, e.g. of axles, rollers, rolls, spindles, rotary furnaces and the like, their drives such as chains, belts, transmissions, universal joints and the like as well as their associated carrier elements such as support frame, machine beds, foundations etc., with measurement accuracies of below 1 mm/m.

2. Description of Related Art

The object of the invention is to specify a method by which the angle measurement of bodies to be mutually aligned can be performed with an expenditure of time, and in some cases also a design complexity, which is substantially less than in the case of the known devices and ancillary means for this purpose.

In contrast to the known methods, in which as a rule a plurality of devices and ancillary means have to be secured to the bodies to be measured, aligned with respect to one another and then moved in common with bodies in a measurement cycle, in the case of the inventive method it is merely necessary for a single position measuring sensor which is simple to handle and which is equipped with an optical gyroscope to be applied in a few measurement positions to in each case two bodies to be aligned with respect to one another and to be read off directly or electronically, with respect to gyro angle and inclination, in order to be able to establish whether any position corrections at all, and, if so, which ones are necessary in order to achieve the desired alignment The operator's measurement time required for this is far shorter than that which is necessary when using the known devices and ancillary means A reduction in the operator's measurement time of up to 95% is to be expected.

The invention is based on the finding that optical gyroscopes are distinguished by a very low noise level thus, by way of example a known fiber optic gyroscope (referred to in the English literature in abbreviated form as FOG) has a noise level of only 0.1° per root hour when using a fiber ring having a diameter of approximately 80 mm—and that, on the basis of such a low noise level with the observance of a time interval measuring in the order of magnitude of a few seconds for the application of the measuring sensor to the two bodies to be aligned for the purpose of obtaining a pair of measured values, it is possible to obtain measured values which are absolutely accurate enough, because in this gyroscope resetting time, which although short is sufficient for practical purposes, a gyroscope which is appropriately dimensioned according to the given possibilities only drifts by a few grad, which is sufficient for most measurement problems.

The accuracy of measurement is all the greater, the more rapidly and/or more frequently the measuring sensor can be reset with its optical gyroscope A further object of the invention is to provide a position measuring sensor for determining the spatial position of two bodies with respect to one another, which sensor has a high accuracy of measurement for angle measurements and is particularly suitable for carrying out the inventive method.

In the text which follows, the invention is explained in even greater detail with the aid of the drawing, by reference to an illustrative embodiment.

DETAILED DESCRIPTION OF THE INVENTION

Figure 1:
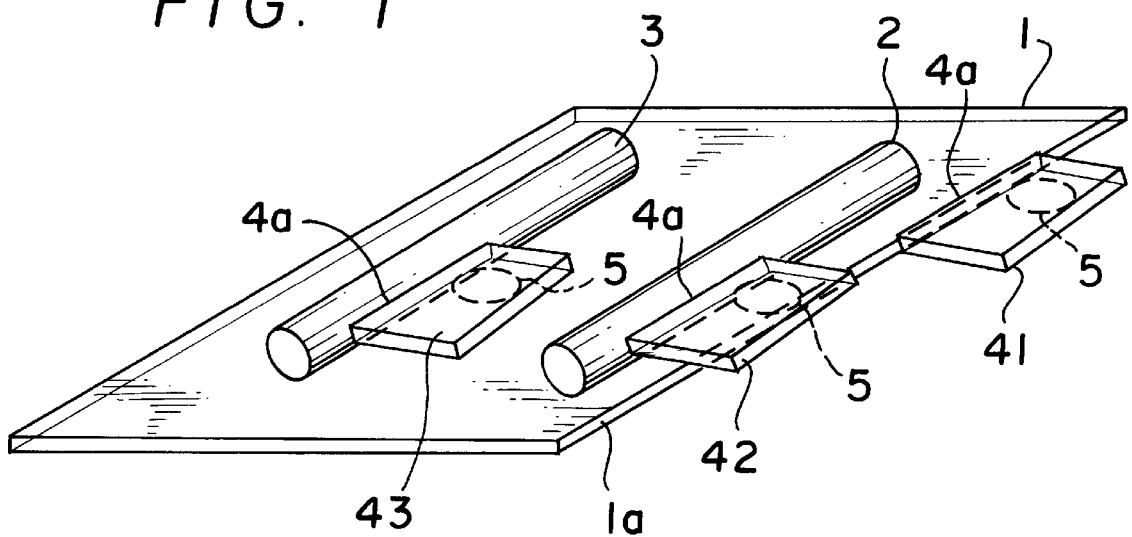
FIG. 1 diagrammatically shows three bodies to be aligned with respect to one another, as well as a position measuring sensor to be applied sequentially to these, in perspective representation, and FIG. 2 diagrammatically shows a preferred embodiment of a position measuring sensor for measuring the relative angular position of the bodies in FIG. 1, likewise in perspective representation.

FIG. 1 shows, in perspective representation, a first body 1, which serves as carrier and which, for the sake of simplicity, is represented as a plate, as well as two further bodies 2 and 3 of cylindrical outer contour, which are to be aligned in relation to the first body 1 and with respect to one another. With an appropriate design in detail, it would be possible for the body 1 to comprise a machine bed and for the bodies 2 and 3 to comprise rollers, which are mounted on the machine bed to be rotatable about their longitudinal axis and are to be aligned with respect to their axes of rotation parallel to one another as well as in a defined angular position with respect to a reference surface on the machine bed.

In the illustrative embodiment, the planar lateral end face 1a serves as reference surface on the body 1, and the longitudinal axes of the roller-shaped bodies 2 and 3 are to be aligned parallel to one another and to the reference surface 1a.

As represented in FIG. 1, the possibly necessary position correction values for the alignment to the aforementioned desired mutual angular position are obtained by a position measuring sensor 4 being applied by its contact surface 4a successively (4-1, 4-2, 4-3) to the reference surface 1a on the body 1, parallel to the longitudinal central axis to the cylindrical periphery of the body 2 and parallel to the longitudinal central axis to the cylindrical periphery of the body 3 and, in this case, in each instance being held in such a spatial alignment that the plane 5a of the fiber ring of a fiber optic gyroscope 5 which is situated in the position measuring sensor 4 and which is aligned in a defined manner with respect to the sensor contact surface 4a extends parallel to a reference plane in space, e.g. parallel to the horizontal plane. After each application to one of the bodies 1, 2 and 3, the gyro angle measured by the fiber optic gyroscope is read off with respect to a reference direction in the plane of the fiber ring or is output as a corresponding electrical signal by the position measuring sensor to a dataprocessing device which is not shown.

Fiber optic gyroscopes are distinguished by an only very small drift angle per unit time It is currently possible in practice to achieve drift angles of a few μrad per root second, so that a gyro angle display accuracy which is in most cases quite sufficient for practical purposes can be achieved throughout the measurement process, if it is insured that the position measuring sensor is reset between the bodies 1, 2 and 3 and read off within a time interval in the order of magnitude of, for example, 10 to 20 seconds. In this case, it is also possible for example to proceed in such a way that firstly a reference position measurement is carried out on the body surface 1a of the body 1 and as the next item a position location measurement is carried out on the periphery of the body 2, then another reference position measurement on the body surface 1a, position location and another measurement on the periphery of the body 3, the predetermined time interval being available for each resetting.

To determine the mutual alignment of the bodies 1, 2 and 3 in space, it may be necessary to carry out further reference and position location measurements on the bodies 1, 2 and 3 in a spatial angular position of the position measuring sensor 4 parallel to a reference plane which includes a defined angle, e.g. 90°, with the reference plane which was utilized for the first measurements.

Figure 2:
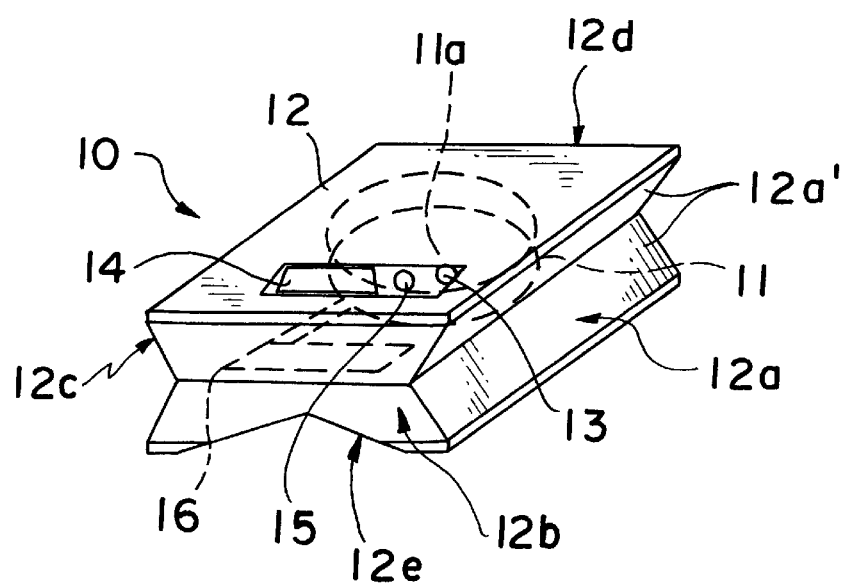

FIG. 2 shows diagrammatically, in perspective representation a position measuring sensor 10 which is particularly suitable for carrying out the inventive measuring method and could be used as position measurement sensor 4 in the angle measurement of bodies 1, 2 and 3 in FIG. 1. This measuring sensor 10 is equipped with an optical gyroscope 11, preferably a fiber optic gyroscope, which is fixedly disposed in a sensor housing 12. The sensor housing 12 has four outer contact surfaces 12a–12d which are parallel to one another in opposite pairs and perpendicular to one another in mutually adjoining pairs, as well as a further contact surface 12e which stands perpendicular to all four of the abovementioned contact surfaces. The statements "parallel to one another" and "perpendicular to one another", apply de facto to the contact surfaces 12a–12e even in circumstances in which these are not continuously planar surfaces, but, as represented in FIG. 2, surfaces which consist in each instance of two planar surface portions, e.g. 12a', which enclose a shallow angle with one another. By means of the incorporation of the optical gyroscope in a fixed, defined position into the position measuring sensor 10, the plane 11a of its optical ring, in this case of the fiber ring, is also aligned in a defined manner with respect to the outer contact surfaces 12a–12e on the housing 12 of the position measuring sensor 10.

Furthermore, the position measuring sensor 10 has a computer interface 13 for calibration purposes and measurement data processing, an indication 14 for gyro angle and inclinations, a zero key and indication switch-over 15 and an accurate double-action inclinometer 16 to establish the angular position of the position measuring sensor 10 with respect to the vertical.

The computer interface 13 makes it possible to transmit the data of the gyro angle and of the inclination which are available in each instance in the applied condition of the position measuring sensor to a computer, not shown, which computes from these data the values of the directions which are possibly necessary for the purpose of bringing the bodies 1, 2 and 3 which are to be aligned relative to one another into the desired alignment conditions.

According to the inventive method and with the inventive position measuring sensor, it is also possible to align body axes, body surfaces and the like in a manner other than parallel to one another, e.g. perpendicular with respect to one another, in a simple manner, very accurately with a low expenditure of time.

In principle, it is also possible to use optical gyroscopes in the form of laser gyroscopes.

What is claimed is:

1. An angular position measuring sensor for determining a difference of angular position of two bodies with respect to each other, comprising:

a) a housing having at least one outer contact surface for mounting on a countersurface of a body;

b) at least one optical gyroscope in the housing, said optical gyroscope having an optical ring that is contained in a plane that is aligned in a defined manner relative to the outer contact surface of the housing; and c) means for outputting from the sensor information for aligning the plane containing the optical ring relative to vertical and an angular position of the plane relative to a reference direction of the body to be aligned.

2. The angular position measuring sensor according to claim 1, wherein the optical gyroscope is a fiber-optic gyroscope.

3. The angular position measuring sensor according to claim 1, wherein the housing has a plurality of contact surfaces disposed in a defined relationship with respect to each other.

4. The angular position measuring sensor according to claim 3, wherein at least one of said contact surfaces comprises a pair of planar surface portions which are at an obtuse angle with respect to each other for engaging a curved countersurface of the body to be aligned.

5. The angular position measuring sensor according to claim 1, further comprising a plumb for determining said alignment of the plane containing the optical ring relative to vertical.

6. The angular position measuring sensor according to claim 1, further comprising a plumb for determining alignment of the plane containing the optical ring relative to vertical.

7. The angular position measuring sensor according to claim 1, wherein said means for outputting comprises a computer interface for outputting of data.

8. The angular position measuring sensor according to claim 1, further comprising a computer interface for outputting of data.

* * * * *